F. H. WARD.
WAGON.
APPLICATION FILED OCT. 20, 1920.

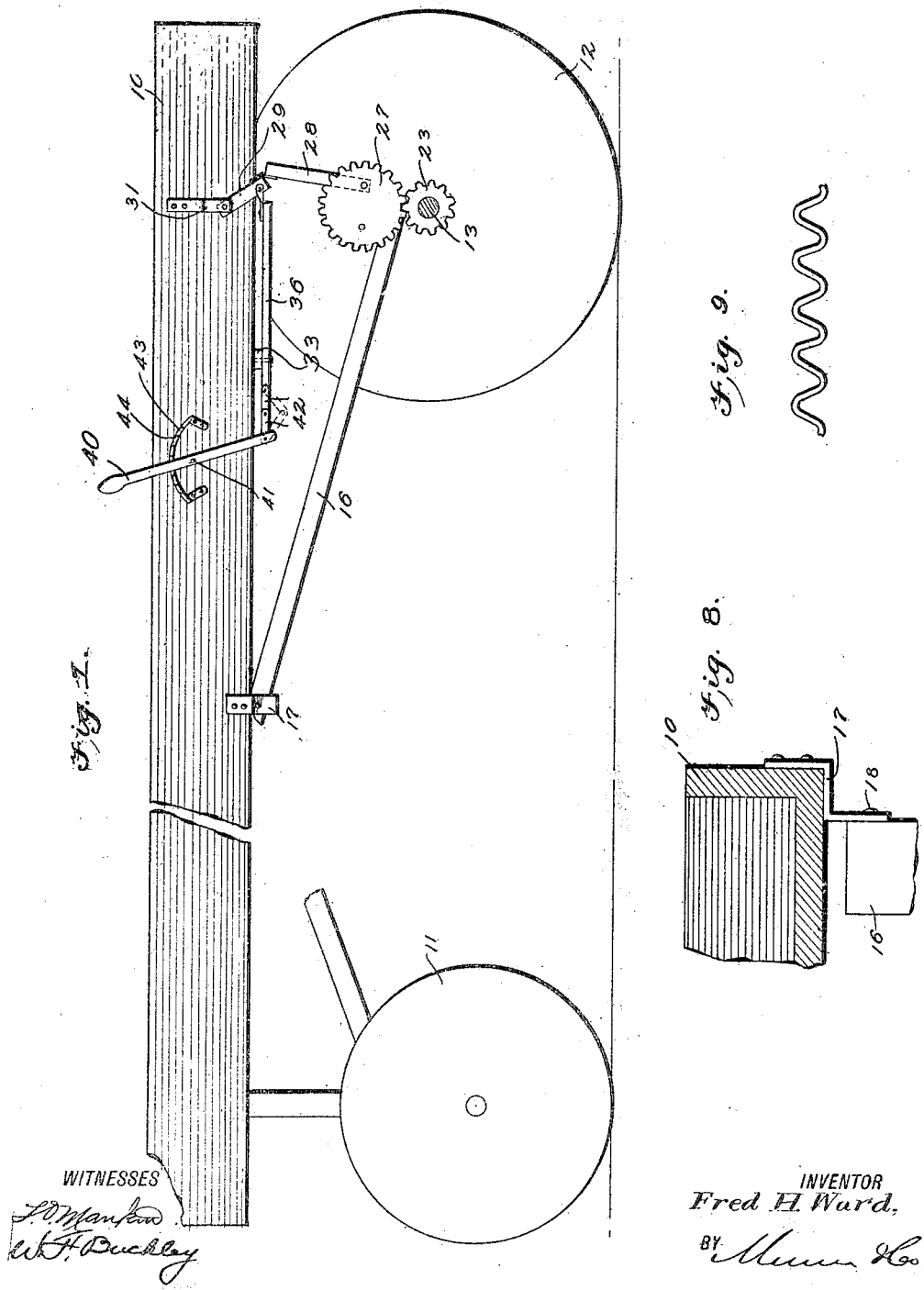

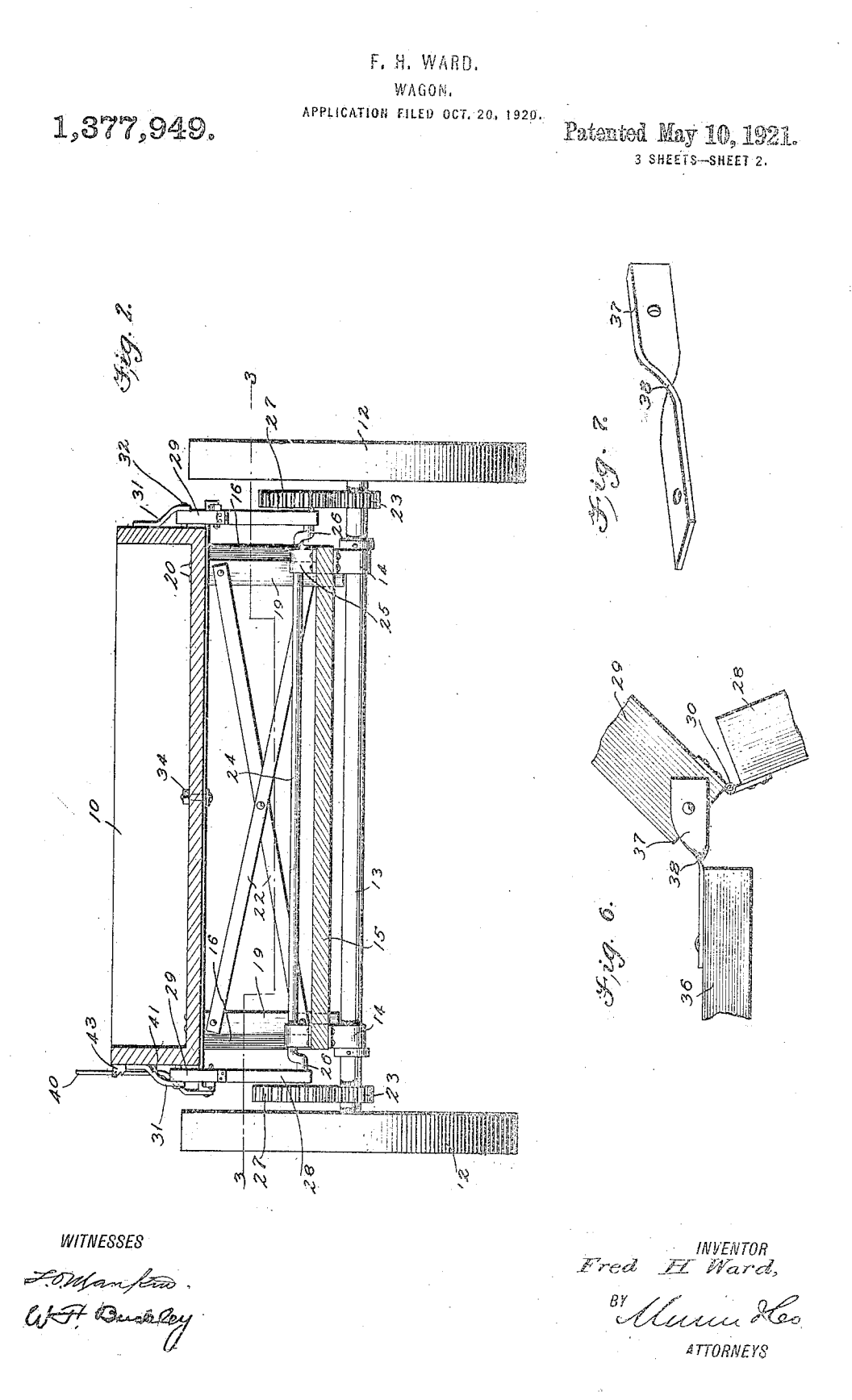

1,377,949.

Patented May 10, 1921.
3 SHEETS—SHEET 2.

WITNESSES

INVENTOR
Fred H Ward,
BY
ATTORNEYS

F. H. WARD.
WAGON.
APPLICATION FILED OCT. 20, 1920.
1,377,949.
Patented May 10, 1921.
3 SHEETS—SHEET 3.
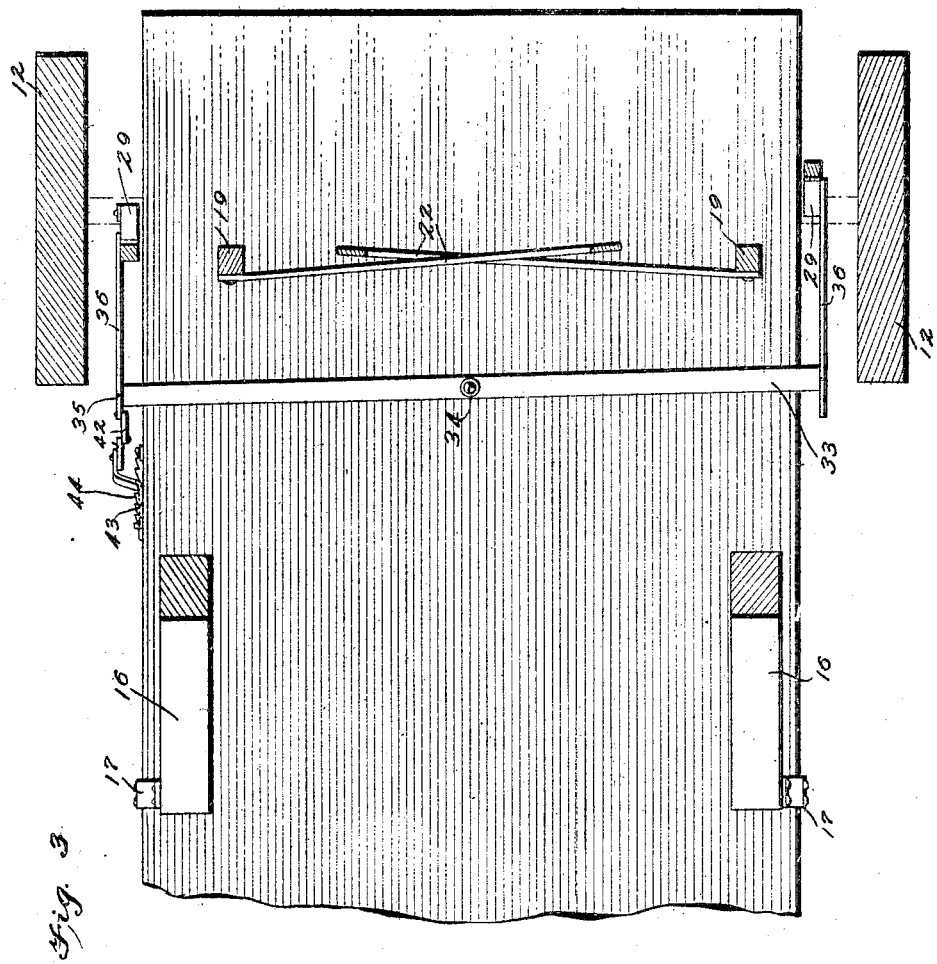
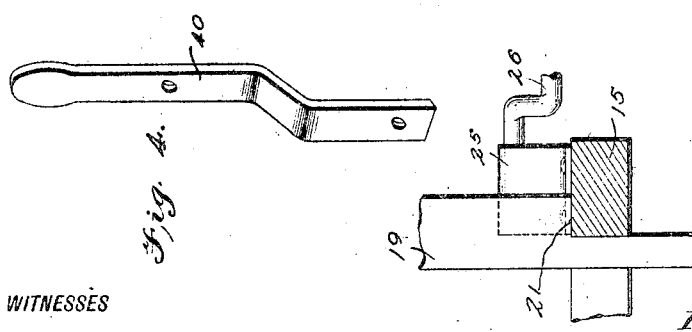
WITNESSES
INVENTOR
Fred H Ward,
BY
ATTORNEYS

UNITED STATES PATENT OFFICE.

FRED H. WARD, OF WASHINGTON, DISTRICT OF COLUMBIA.

WAGON.

1,377,949.   Specification of Letters Patent.   Patented May 10, 1921.

Application filed October 20, 1920. Serial No. 418,202.

*To all whom it may concern:*

Be it known that I, FRED H. WARD, a citizen of the United States, and a resident of the city of Washington, in the District of Columbia, have invented certain new and useful Improvements in Wagons, of which the following is a specification.

The present invention relates to wagons, and has for its object to provide a wagon which may be utilized solely for amusement purposes and which presents for this purpose a wagon body partaking of a wave-like or rolling motion relatively to the running gear which carries the body thereof; which may be controlled so as to present the features and characteristics of an ordinary wagon, and which is of simple and durable construction, reliable in construction, and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a fragmentary side elevational view of the invention;

Fig. 2 is a transverse vertical sectional view;

Fig. 3 is a fragmentary view in transverse horizontal section, on line 3—3 of Fig. 2;

Fig. 4 is a detail perspective view of the operating lever of the control;

Fig. 5 is a detail view, partly in section and partly in elevation, showing the manner in which the shoulder standard coöperates with the truck;

Fig. 6 is a fragmentary detail view, showing the construction of the drive rod and associated connecting rod and link;

Fig. 7 is a detail perspective view of the universal joint between the connecting rod and link;

Fig. 8 is a fragmentary detail view, partly in elevation and partly in section illustrating the connection of the reach rod to the wagon body; and Fig. 9 is a detail view of the sheet iron corrugations employed to cover the teeth of the wagon gears.

Referring to the drawings wherein for the purpose of illustration is shown the preferred embodiment of the invention, the numeral 10 designates a wagon body of any conventional or desired construction.

Running gear is provided for the wagon body and includes front wheels 11 which support the front end of the wagon body and are pivotally and rotatably connected therewith as usual. The running gear also includes ground wheels 12 fixed to the ends of the rotatable axle 13 which is mounted in journals 14 fixed to the underside of a truck 15. Reach rods 16 are fixed at one end to the truck 15 and are pivotally connected at their opposite ends to the wagon body, as shown in detail in Fig. 8, by means of a Z-bar 17 secured to the wagon body and pivotally connected, as at 18, with its respective reach rod. The motion of the wagon body toward the truck is limited by means of shouldered standards 19 fixed, as at 20, to the floor of the wagon body and having shoulders 21 which engage the truck 15 to limit the movement of the wagon body toward the truck, as clearly shown in Fig. 5. These standards 19 are two in number and are connected by cross braces 22, as shown in Fig. 2.

Means is provided for imparting a rolling or wave-like motion to the wagon body when desired and includes driving pinions 23 fixed to the axle 13 adjacent the wheels 12 thereof. A shaft 24 is journaled in bearings 25 arranged on the truck and is provided at its ends with cranks 26 to which are eccentrically fixed gear wheels 27 meshing with the drive pinions 23. Drive rods 28 are pivotally secured at one end to the cranks 26 and the other ends of the drive rods are pivotally secured to links 29 by means of hinges 30. The other ends of the links are pivotally connected to the side of the wagon body by means of straps 31 and pivot bolts 32. A swinging cross lever 33 is pivotally connected at its center, as at 34, to the under side of the wagon body and is pivotally connected at its ends, as indicated at 35, to connecting rods 36 which are also pivotally connected by means of a connecting bar 37 with the link or drive rod, preferably with the link. The pivot bar 37 is twisted, as at 38, as shown in Fig. 6, and thus serves as a universal coupling between each connecting rod and its associated link.

Controlling means is provided for rendering the means for imparting the rolling motion to the wagon body active or inactive, as desired. This means includes an operating lever 40 pivotally connected intermediate its ends, as at 41, to the side of the wagon and having its lower end pivotally connected by means of a series of pivot links 42 to one of the connecting rods 36. A segment 43 having a plurality of ratchets 44 thereon coöperates with the operating lever 40 to secure it in desired position; the lever 40 being of resilient material snaps into position behind the vertical walls of the ratchet and may be flexed outwardly to disengage the vertical walls when desired.

In operation it will be seen that when the operating lever 40 is positioned, as shown in Fig. 1, the rotation of the ground wheels 12 is effective only to advance the vehicle and not to impart a wave-like or rolling motion to the wagon body as at this time the wagon body is supported upon the trucks by means of the standards 19. The motion of the ground wheels and axle produces at this time an idle motion only of the gear wheels, drive rods, links, connecting rods and swinging lever. It is to be noted that the operating lever does not partake of this motion because of the action of the links 42. When it is desired to have the wagon body partake of the wave-like motion, the operating lever 40 is grasped and pulled backwardly until the links and drive rods are in substantial alinement and the engagement of the operating lever with its rack segment 44 maintains these parts in substantially this relation. When the ground wheels are advanced in this position the rotation of the axle which carries them is effective to impart a rolling or wave-like motion to the wagon body.

The drive pinions and gear wheels 23 and 27 are preferably constructed of wood and covered with corrugated sheet metal such as shown in Fig. 9.

I claim:

1. A wagon comprising a wagon body, running gear including a truck, a rotatable axle journaled on said truck, wheels on said axle, reach rods secured to the truck and pivotally secured to said wagon body, and a shouldered standard limiting the movement of said wagon body toward said truck, means for imparting a rolling motion to said wagon body including drive pinions fixed to the axle, a shaft rotatably journaled on the truck and having a crank at its ends, gears eccentrically fixed to the cranks and meshed with the drive pinions, drive rods eccentrically pivoted to the gears at the rear end, links pivotally connected to said drive rods at the rear end and to the wagon body at their opposite end, a swinging lever pivoted to the wagon body and connecting rods between the swinging lever and the links, and controlling means adapted to render the means for imparting the rolling motion to the wagon body active and inactive and consisting of a lever pivoted intermediate its ends to the wagon body and pivotally connected to one of the connecting rods, and a rack having ratchet teeth engageable with the operating lever for retaining the operating lever in adjusted position.

2. A wagon comprising a wagon body, running gear including a truck, a rotatable axle journaled on said truck, wheels on said axle, reach rods secured to the truck and pivotally secured to said wagon body and a shouldered standard limiting the movement of said wagon body toward said truck, means for imparting a rolling motion to said wagon body including drive pinions fixed to the axle, a shaft rotatably journaled on the truck and having cranks at its ends, gears eccentrically fixed to the cranks and meshed with the drive pinions, drive rods eccentrically pivoted to the gear at the rear end, links pivotally connected to said drive rods at the rear end and to the wagon body at their opposite end, a swinging lever pivoted to the wagon body and connecting rods between the swinging lever and the links.

3. A wagon comprising a wagon body, running gear therefor including an axle, and wheels secured to said axle, means for imparting a rolling motion to said wagon body including pinions fixed to the axle, a rotatable shaft having cranks at its ends, gears eccentrically fixed to the cranks and meshed with the drive pinions, drive rods eccentrically pivoted to the gears at one end, links pivotally connected to the drive rods at one end and to the wagon body at the opposite ends, a swinging lever pivoted to the wagon body and connecting rods between the swinging lever and the links.

4. A wagon comprising a wagon body, running gear therefor including an axle, and wheels secured to said axle, means for imparting a rolling motion to said wagon body including pinions fixed to the axle, a rotatable shaft having cranks at its ends, gears eccentrically fixed to the cranks and meshed with the drive pinions, drive rods eccentrically pivoted to the gears at one end, links pivotally connected to the drive rods at one end and to the wagon body at the opposite ends, a swinging lever pivoted to the wagon body and connecting rods between the swinging lever and the links, and controlling means including an operating lever pivoted intermediate its ends to the wagon body and pivotally connected at its lower end to one of said connecting rods.

FRED H. WARD.